(12) United States Patent
Klein et al.

(10) Patent No.: US 9,104,630 B1
(45) Date of Patent: Aug. 11, 2015

(54) ONLINE ACCOUNT RESET, ROLLBACK, AND BACKUP

(71) Applicant: GOOGLE INC., Mountain View, CA (US)

(72) Inventors: Peter Klein, San Francisco, CA (US); Andrew Swerdlow, San Francisco, CA (US)

(73) Assignee: Google Inc., Mountain View, CA (US)

( * ) Notice: Subject to any disclaimer, the term of this patent is extended or adjusted under 35 U.S.C. 154(b) by 323 days.

(21) Appl. No.: 13/659,721

(22) Filed: Oct. 24, 2012

(51) Int. Cl.
  *G06F 11/14* (2006.01)
  *H04N 21/45* (2011.01)

(52) U.S. Cl.
  CPC ........ *G06F 11/1469* (2013.01); *H04N 21/4532* (2013.01)

(58) Field of Classification Search
  CPC ............ G06F 11/1464; G06F 11/1448; G06F 11/1458; H04N 21/4532; H04N 21/454; H04N 41/0843
  See application file for complete search history.

(56) References Cited

U.S. PATENT DOCUMENTS

| | | | |
|---|---|---|---|
| 6,543,004 B1 * | 4/2003 | Cagle et al. | 714/15 |
| 2006/0271796 A1 * | 11/2006 | Kaimal et al. | 713/194 |
| 2009/0024915 A1 * | 1/2009 | Cudich et al. | 715/234 |
| 2012/0047581 A1 * | 2/2012 | Banerjee et al. | 726/24 |

OTHER PUBLICATIONS

"Time Machine (Mac OS)", downloaded from en.wikipedia.prg/wiki/Time_Machine_(Mac_OS) on Oct. 3, 2012.
What is System Restore? Microsoft Windows Help, (accessed on Oct. 3, 2012), 1 pg.

* cited by examiner

*Primary Examiner* — Ebrahim Golabbakhsh
(74) *Attorney, Agent, or Firm* — Procopio, Cory, Hargreaves & Savitch LLP

(57) ABSTRACT

Online account reset, rollback, and backup are described, including receiving from a user, by one or more computing devices, a request to alter an online account associated with the user; identifying, based on the request, at least a portion of data associated with the user and the online account, the at least the portion of data identified as being within a time window defined by the user; and in response to the request, modifying, using the one or more computing devices, the at least the portion of data within the time window.

20 Claims, 11 Drawing Sheets

ONLINE ACCOUNT RESET, ROLLBACK, AND BACKUP

BACKGROUND

There are occasions when a user may want to roll back an activity associated with his or her online account. For example, the user may have inadvertently posted information on the account. There are occasions when a user may want to start fresh with his or her online account, such as when the user is moving to a new country, starting a new job, going through a relationship change, or simply in need of a change. However, it may be difficult for the user to roll back an activity or start fresh with an online account (e.g., a social network account).

One option for the user is to manually delete everything the user wants to roll back or "leave behind" in order to start fresh. However, this option is tedious and could take substantial time (e.g., days or weeks for starting fresh).

Another option for the user to start fresh in the online world is by deleting the entire account and creating a new account. However, deleting the entire account may not be desirable because the user may want to retain some account data (e.g., contact information, account preferences, and privacy settings, etc.).

SUMMARY

The subject matter discussed herein relates generally to data processing and, more particularly, to online account reset, rollback, and backup.

Online account reset, rollback, and backup are described. The subject matter may provide various advantages to users. For example, users can take steps to change or correct actions associated with their accounts. A user can rollback one or more actions that were taken inadvertently, accidentally, by unauthorized users on the user's behave, or for any reason. Users are given greater control of their accounts. For example, users can reset their accounts without losing the benefits of, for example, account settings and contact information.

The subject matter includes at least a computing device, a computer product, and a method for receiving from a user, by one or more computing devices, a request to alter an online account associated with the user; identifying, based on the request, at least a portion of data associated with the user and the online account, the at least the portion of data identified as being within a time window defined by the user; and in response to the request, modifying, using the one or more computing devices, the at least the portion of data within the time window.

In some implementations, the time window includes a starting time and an ending time, and at least the starting time is provided by the user with the request.

In some implementations, the time window includes a starting time and an ending time, and the ending time is defined by a time when the request is received.

In some implementations, the modifying the at least the portion of data includes deleting the at least the portion of data.

In some implementations, the modifying the at least the portion of data includes disassociating the at least the portion of data from the user.

In some implementations, the request is a reset request for a full reset, the at least the portion of data include content data and account data, and the time window being from a time after initialization settings of the account have been set up to another time when the request is received.

In some implementations, the request is a reset request for a content reset, the at least the portion of data include content data and no account data.

In some implementations, the request is a reset request for a category reset, the method further comprising receiving a category selection from the user of the at least the portion of data.

In some implementations, the request is a rollback request and the at least the portion of data is identified from a plurality of transactions associated with the account.

In some implementations, additional features may be included, such as receiving another request, before the request to alter the account, from the user to back-up data associated with the account, the backup data include the at least the portion of data; and storing the backup data.

In some implementations, additional features may be included, such as receiving a restore request from the user; and restoring at least a portion of the backup data, wherein the at least a portion of the backup data are restored to associate with the account.

In some implementations, the another request is a backup request, the method further comprising providing a user interface that includes a control for the user to enter the backup request.

In some implementations, the request is a reset request, the method further comprising providing a user interface that includes a control for the user to enter the reset request to alter the account.

In some implementations, the request is a rollback request, the method further comprising providing a user interface that includes a control for the user to enter the rollback request to alter the account.

In addition to a method as described above, the implementations may include a system or a computer-readable medium, but are not limited thereto.

DETAILED DESCRIPTION

Figure 1:
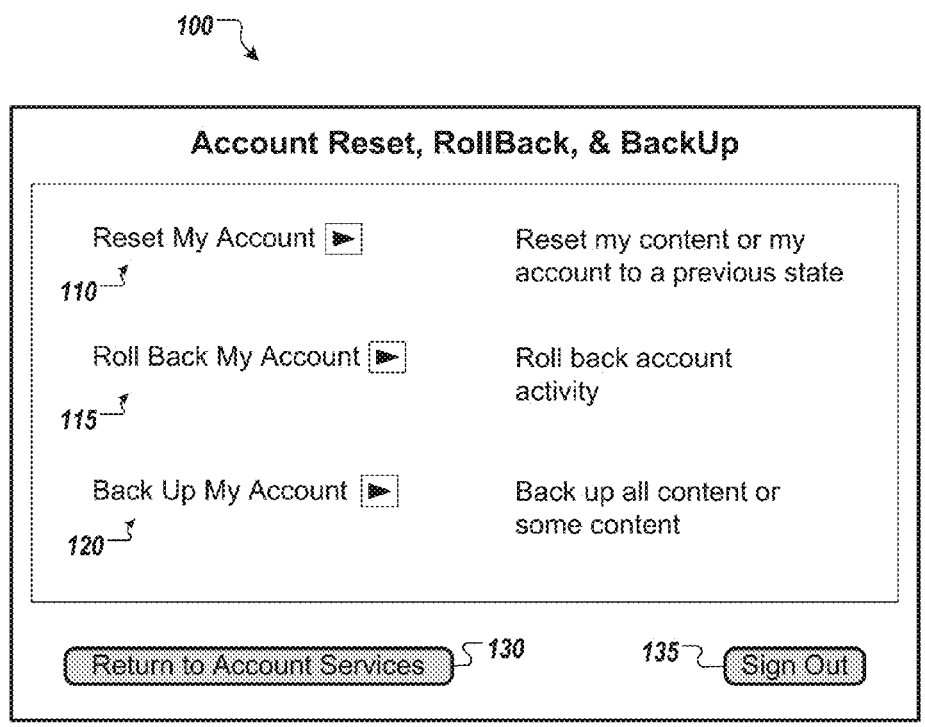
FIG. 1 shows an example user interface for resetting and backing up an online account.

The subject matter described herein is taught by way of example implementations. Various details have been omitted for the sake of clarity and to avoid obscuring the subject matter. The examples shown below are directed to structures and functions for implementing online account reset, rollback, and backup.

As used herein, the term "account" or "online account" refers to a product, service, or application associated with a user. A user may have, subscribe to, and/or use one or more accounts or online accounts (e.g., a user may have an email account, a social network account, a photo sharing account, a video sharing account, an online storage account, a mobile account, a blog account, etc.).

An account can be an internet or external account (e.g., an end user subscribing to an openly, publicly, or semi-publicly available service), an intranet or internal account (e.g., an employee subscribing to a service of a company or firm), an extranet or controlled availability account (e.g., an account available to vendors, customers, or other controlled subscribers), or another type of account.

As used herein, the term "product" or "service" or "application" refers to any information, data, communication, infrastructure, organization, service, assistance, entertainment, or the like provided by one or more providers via online communication to at least one user. Examples of products, services, or applications may include, but are not limited to, online searching, e-commerce services, maps, locational data, dating services, online forums, online platforms, bulletin boards, social networks, websites, sites, chat rooms, email communication, image or photo sharing sites, video sharing sites, audio sharing sites, data sharing platforms, data storage, software, tax preparation and filing, gaming, mobile applications, news, translation, toolbar, calendar, instant messaging, short message service, voice, phone, video communication service, and the like. Products, services, or applications may be provided on any platform or device ranging from a mobile device (e.g., smartphone), to a semi-mobile device (e.g., a laptop), and to a non-mobile device (e.g., a kiosk, television, computer, etc.). A product, service, or application may communicate to a provider or another product, service, or application using a wired or wireless connection.

As used herein, the term "content" or "content data," with respect to account content, refers to any data or information that can be put online (e.g., communicated in an email or posted on a website, etc.). Examples of "content" may include, but are not limited to, posts/reposts, communication messages (e.g., e-mails), any data stored online or with a cloud service, data in literal expression (e.g., a writing, document, information, comment, suggestion, recommendation, webpage, or the like) and data in artistic expression in any medium (e.g., any writing, images, video, and a audio), any part thereof, any combination thereof (e.g., provided in webpage), and any representation thereof (e.g., a link, an audio representation, and a visual (representation of any literal and/or artistic expression.

Content data associated with an account (e.g., account content) is content stored for maintaining the account and providing services associated with the account. Account content is a primary copy of data (which may have backup copies) associated with an account, and the deletion of some of which would affect services associated with the account. Account content does not include log data, logs, and/or log files, which are additional or temporary copies of data that may be deleted and/or altered by system administrators without affecting services associated with the account.

As used herein, the term "category" or "type" with respect to account content refers to the grouping (e.g., by a service provider and/or a user) of data and services. A category of data may come from a service (e.g., email service), a part of a service (e.g., only emails to and from some users or email addresses), or a combination of two of more services (e.g., the combination of at least a part of one service, such as email services, with at least a part of another service, such as calendar service or contracts management service). For example, a service provider and/or a user may define a "media" category of data to include different combinations of one or more of audio data, video data, photo data, the metadata thereof, and literal data. A category of data may be a portion of data associated with an account and/or user.

As used herein, the term "account data" refers to data associated with a user that exclude account content. Examples of account data may include, but are not limited to, the user's profile, address book, contact information, email addresses, information about users, circles, shared-circles or s-circles (e.g., circles shared with another user), settings, preferences, etc.

As used herein, the term "post" (noun) or "repost" (noun) refers to content that has been posted, reposted, shared, re-shared, published, republished, or otherwise put online by one user for access by the user and/or by at least one other user. Content that has been posted, reposted, shared, or re-shared (Content 1) can be further posted, reposted, shared, or re-shared with more users (Content 2). Content 2 may or may not be the same as Content 1. For example, Content 2 may be a link to Content 1. Content 2 may include additional information, e.g., annotations or comments, not found in Content 1. Content 2 may include only part of Content 1.

As used herein, the term "website" or "site" refers to a set of web pages for providing or supporting related services. A website can be hosted on at least one computing device (e.g., a system, server, web server, application server, client, or any label) accessible via a network or connection (wired and/or wireless). A website can be accessed and/or supported using at least one top-level Uniform Resource Locator (URL, e.g., "abc.gov," "123.org," "zxc.com," "bestads.com," "virtualbank.com," and the like). A website can be operated and/or supported by one or more business entities. For example, ZXC Corporation may operate the website "zxc.com" that includes web pages, content, and/or services from "zxc.bestads.com" (e.g., advertisement services provided by another firm) and "virtualbank.com/zxc-payment-services" (e.g., financial services provided by a financial institution).

An online account (e.g., a social network account) accumulates data over time. The data associated with an account can be classified as account data and content data. Account data are data that enable the functionality of the account. Examples of account data may include contact information, such as e-mail addresses, information about users, circles, settings, preferences, etc. Content data are data that are shared and/or communicated between the account and other accounts. Examples of content data may include images, videos, audios, posts/reposts, communication messages (e.g., emails), the sharing of account data (e.g., sharing the contact information of a user with another user), etc.

Mechanisms or user interfaces may be provided for users to back-up data associated with their accounts. For example, a user may back-up all account data and content data, back-up just the account data or just the content data, or back-up one or more categories of the account data or content data, etc. After backing-up, or if the user does not desire to back-up any data, the user may reset his or her account or roll back one or more transactions. Users may back-up and/or reset one or more accounts at a time.

Mechanisms or user interfaces may be provided for users to roll back (e.g., undo) one or more transactions. A transaction is an activity that publishes, releases, or otherwise causes information to become accessible by another user. The posting of information on a social network is an example of a transaction. Other examples include, but are not limited to, providing comments; giving feedback (e.g., "+1" or "like," etc.); sharing a photo, audio, video, document, etc.; communicating a message (e.g., text message, email, blog, etc.); putting information on a public, semi-public, or private forum or platform (e.g., adding a calendar entry on a social network or to a company calendar that is accessible by at least one user other than the user adding the entry). Rolling back transactions associated with an account alters the account (e.g., alters or modifies the data associated with the account).

Mechanisms or user interfaces may be provided for users to reset their accounts. Resetting an account alters the account (e.g., alters or modifies the data associated with the account). For example, a user may request a "full reset" to an account, where account data and content data of that account are deleted (e.g., friend connections are removed), and the account is "returned" to an initial state where only the most basic settings (e.g., the user's name, email address, and other user profile information) remain. In some example implementations, the account is returned to a state as if the account has just been created (e.g., values to the basic settings have not been set).

In some examples, other reset options may be provided. For example, a user may request a "content reset" of an account, which leads to deleting only content data (e.g., images, vides, audios, comments, applications, feedback, etc.) of the account. The account data remain intact (e.g., email addresses are not deleted and friend connections are not severed, etc.). Another reset option may be resetting a category of data or a few categories of data. For example, a user may request resetting the "+1" content data, the audios, the circles, etc. or any combination thereof.

In some examples, mechanisms or user interfaces may be provided for users to request restoring backed-up data associated with their accounts. For example, a user may request a full restore if a full backup and a full reset were performed. If the user requested a partial backup and a partial reset (e.g., of only content data, account data, or one or more categories of data), the user may request a partial restore of his or her account. A restore to an account restores the backed-up data to the account.

FIG. 1 shows an example user interface for resetting, rolling back, and backing-up data of an online account (e.g., altering the online account). User interface (UI) 100 includes UI element "Reset My Account" 110 for resetting a user's account, UI element "Roll Back My Account" 115 for rolling back activity or transactions associated with a user's account, and UI element "Back-Up My Account" 120 for backing-up the user's account. As indicated by button 130 ("Return to Account Services"), as an example, UI 100 may be provided from an "Account Services" UI (e.g., after the user has logged in to a service provider's Account Services interface). The user may log off or sign out from UI 100 using, for example, the "Sign Out" button 135. UI 100 is shown only as an example. Any user interface or mechanism that provides similar functions may be implemented and/or deployed.

Figure 2A:
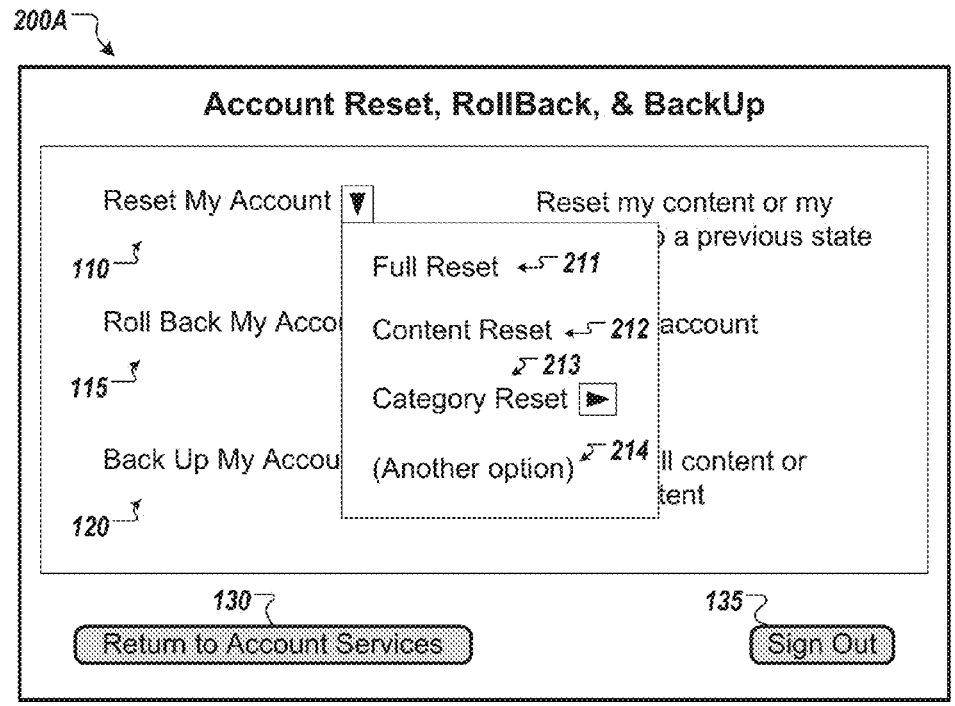
FIGS. 2A-C show additional example features of the user interface of FIG. 1.

FIG. 2A shows additional example features of UI 100, FIG. 1. UI 200A shows an example submenu of "Reset My Account" 110, which may include "Full Reset" 211, "Content Reset" 212, "Category Reset" 213, and another option 214. "Full Reset" 211 may be used to reset account content and account data (described further in FIG. 4A). "Content Reset" 212 may be used to reset account content (described further in FIG. 4B). "Category Reset" 213 may be a submenu or selection list for selecting a category of account content and/or data for resetting (described further in FIG. 4C). In some implementations, a submenu "Acc Data Reset" (not shown) may be provided to reset a user's account data.

Figure 2B:
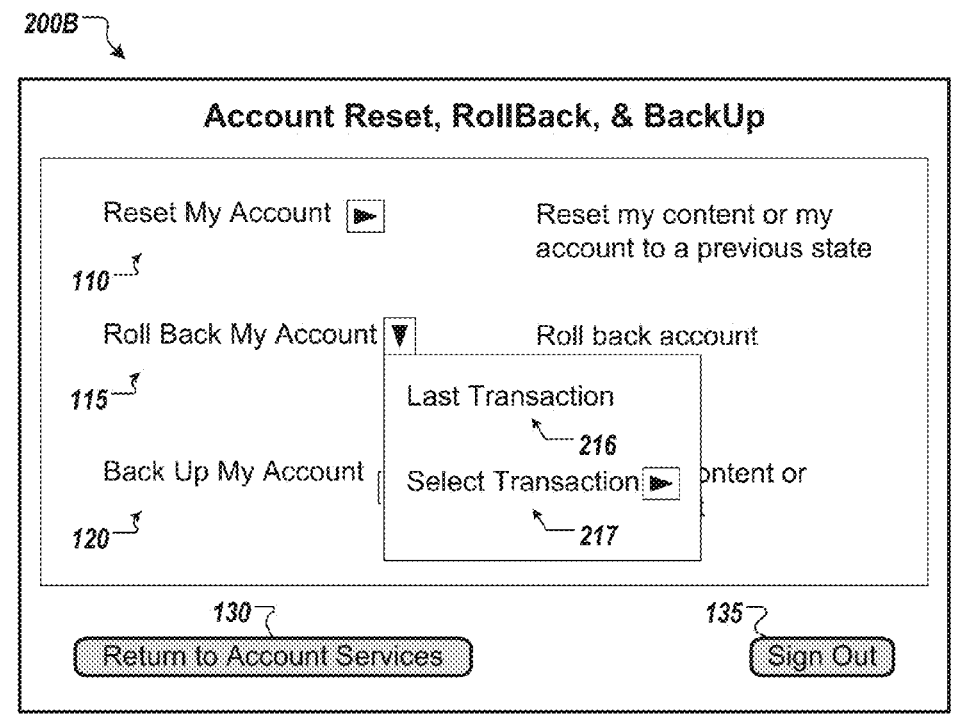

FIG. 2B shows additional example features of UI 100, FIG. 1. UI 200B shows an example submenu of "Roll Back My Account" 115, which may include "Last Transaction" 216 and "Select Transaction" 217. "Last Transaction" 216 may be used to roll back the last transaction occurred (e.g., the last post to a social network). "Select Transaction" 217 may be used to roll back one or more transactions selected by the user. Roll back transactions are described further in FIG. 4D below. In some implementations, additional, fewer, or different submenu options (not shown) may be provided.

Figure 2C:
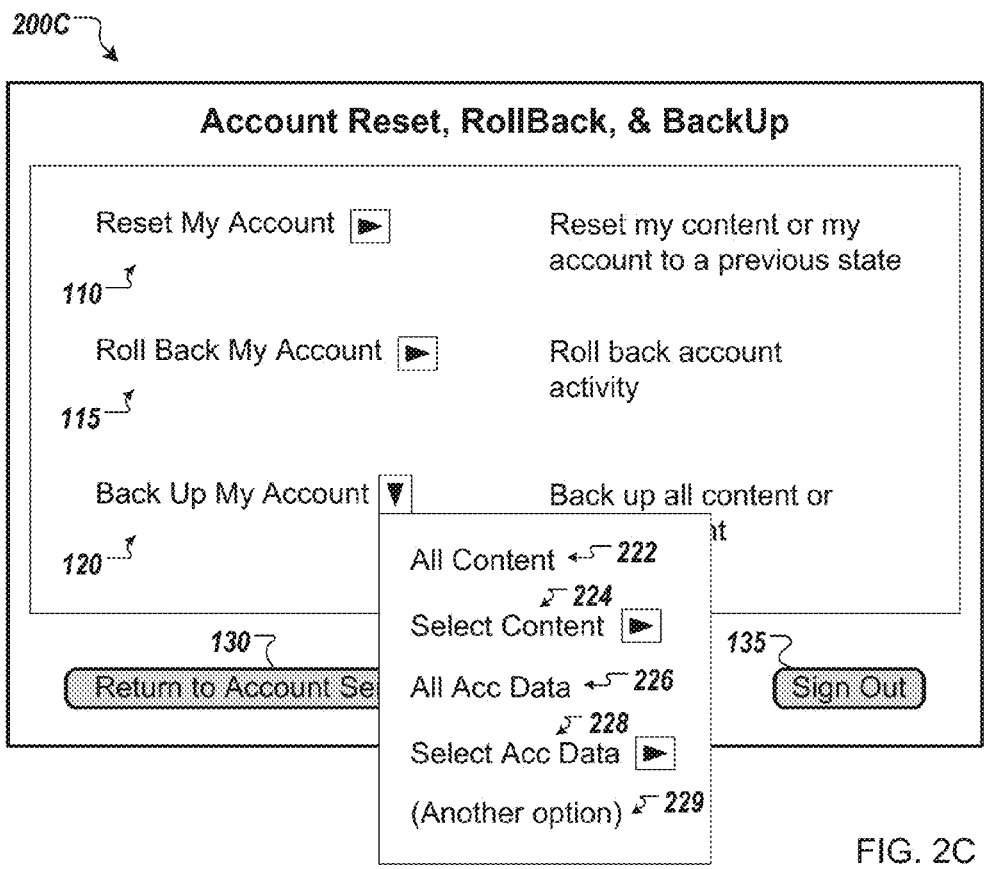

FIG. 2C shows other additional example features of UI 100, FIG. 1. UI 200C shows an example submenu of "Back-Up My Account" 120, which may include "All Content" 222, "Select Content" 224, "All Acc Data" 226, "Select Acc Data" 228, and another option 229. "Select Content" 224 and "Select Acc Data" 228 may be submenus and/or selection lists for selecting account content and account data, respectively, for backup.

"All Content" 222 may be used to back-up the account content of a user's account. "Select Content" 224 may be used to back-up selected account content of the user's account. "All Acc Data" 226 may be used to back-up the account data of a user's account. In some implementations, there may be one option (not shown) for the user to request backup of the user's account content and account data (e.g., the combination of "All Content" 222 and "All Acc Data" 226). "Select Acc Data" 228 may be used to back-up selected account data of the user's account.

Figure 3:
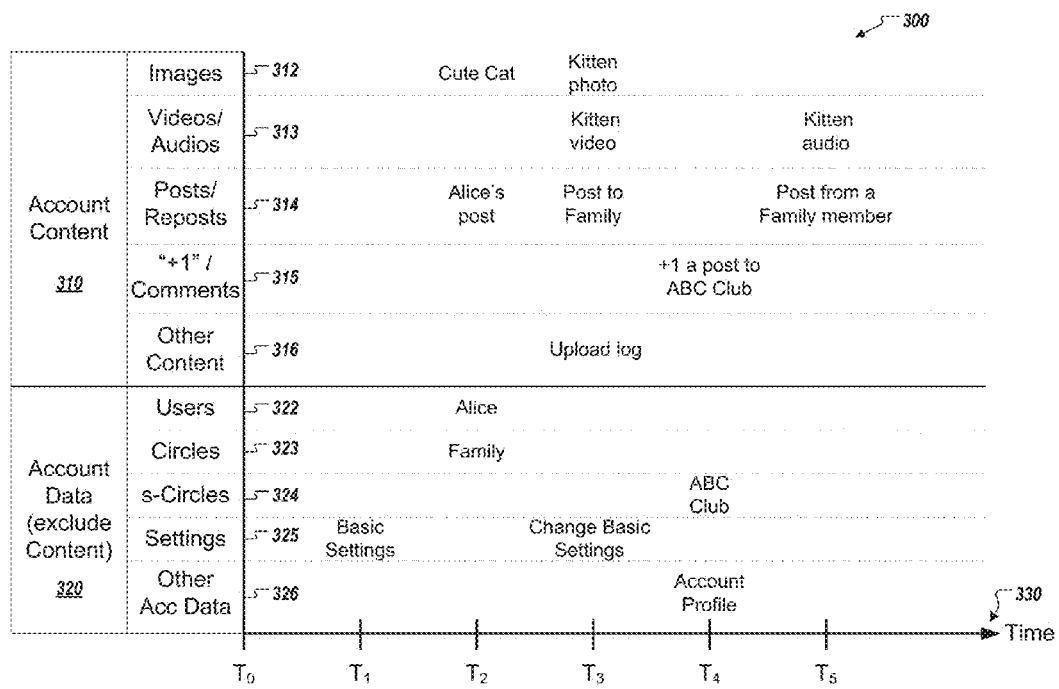
FIG. 3 shows a conceptual view of an example online account.

FIG. 3 shows a conceptual view of an example online account. Account 300 includes account content 310 and account data 320, which encompasses all data associated with the account except account content 310. Account 300 is shown with a timeline 330. Account content 310 and Content data 320, collectively may be referred to as data associated with a user and an account (e.g., the account is the user's account).

Account content 310 includes, for example, images 312, videos and audios 313, posts and reposts 314, comments and "+1" 315, other content 316 (e.g., email messages, communication messages in one or more forms other than email, calendar entries, tasks, notes, maps, videos, search results, location data, blogs, documents, etc.) Account content 310 associated with a user includes, for example, content generated, retrieved, stored, or otherwise accessed by the user. Account content 310 includes content provided, shared, or otherwise communicated to the user.

Account content 310 may be categorized in any manner. For example, content relating to a service (e.g., posts and reposts 314 and comments and "+1" 315 relating to a social network) may be categorized as one category of content (e.g., "social network content," not shown, that includes posts, reposts, comments, "+1"); two categories of content (e.g., as shown, posts and reposts 314 and comments and "+1" 315); or more categories of content (e.g., four categories: posts, reports, comments, "+1"). The categories of content and services are described for illustration purposes. Services and content associated with services (e.g., social networks) include other services and content not shown or described.

Account data 320 associated with a user include, for example, information about the user and other users 322, circles 323 (a circle is a grouping of one or more users), s-circles 324 (e.g., circles used, access, or shared by two or more users), settings (e.g., privacy settings, customization settings of a service, etc.), and other data 326 (e.g., emails addresses, user profiles, etc.).

Timeline 330 is shown, for example, with activities associated with a user's account at a few points in time ($T_0$-$T_5$). Each point ($T_0$-$T_5$) on the timeline represents a snapshot of the user's account at that point. The user has registered, created, or otherwise opened the account at time $T_0$ with a service provider (e.g., the account has been assigned to the user by the service provider). Account credentials (e.g., identifier and/or password) may be associated with the account.

At time $T_1$, the user may have set up or customized the account by, for example, configuring some basic settings. The basic settings may be on the client side, server side, or on both sides. Using an email service for example, basic settings may include settings such as language, number of conversations shown in the inbox each time the user logs in, user interface configuration, account holder's information (e.g., name, address, phone number, photo of the holder, age, etc.), email signatures, etc. If the user uses Internet Message Access Protocol (IMAP) with the email service, the user may configure basic settings, such as account description, full name, email address, user name, password, incoming server, outgoing server, whether to communicate openly or encrypted, etc.

At time $T_2$, the user may have added contact information of another user "Alice" (e.g., to the user's social network service), created a "Family" circle that includes "Alice" as a user, posted a message to Alice (Alice's post) that includes an image of a cat called "Cute Cat."

The posting of the message to Alice and the storing of the "Cute Cat" image may be considered a transaction that can be rolled back. Adding the "Alice" user may be considered a transaction or not a transaction (for rollback purposes) depending on implementations. For example, if other users may see the "Users" information 322 of this account 300 (e.g., see that "Alice" has been added or deleted), changes to "Users" information 322 may be considered as transactions. Changes to "Circle" information 323 may also be considered transactions (e.g., adding the "Family" circle).

At time $T_3$, the user may have changed some basic settings, uploaded a log (e.g., activity log of an application) to a cloud storage service, posted content to the "Family" circle that includes a kitten video, and uploaded a kitten photo to a photo sharing service. The kitten video or a link to the video may be embedded in the post. The post to the "Family" circle may include a link to the kitten photo.

The uploading of the log may be considered a transaction if another user is aware of the log itself or the uploading activity. The posting to the "Family" circle and the kitten video (e.g., tied to the posting) may be considered one transaction. The uploading of the kitten photo may be considered a separate transaction (e.g., referred to in the posting but not tied to the posting).

At time $T_4$, the user may have added/modified an account profile, added an "ABC Club" s-circle, and provided a "+1" feedback to a post to the "ABC Club" s-circle.

The adding of the "ABC Club" s-circle may be considered a transaction due to its sharable nature (versus a circle which is not shared with another user). The posting of the "+1" feedback may be considered a transaction.

At time $T_5$, the user may have received a post from a member of the "Family" circle. A kitten audio may have been added in association with the user (e.g., received the audio in the post or uploaded the audio by the user).

The received post and the kitten audio may not be considered a transaction since the user is a receiver and not a sender. The service provider of account 300 may provide mechanisms (not shown) for the receiving user to delete the post and/or the kitten audio. In similar implementations, the setting of basic settings ($T_1$), the changes to the basic settings ($T_3$) and the addition or modification of the account profile ($T_4$) may not be considered transactions.

Figure 4A:
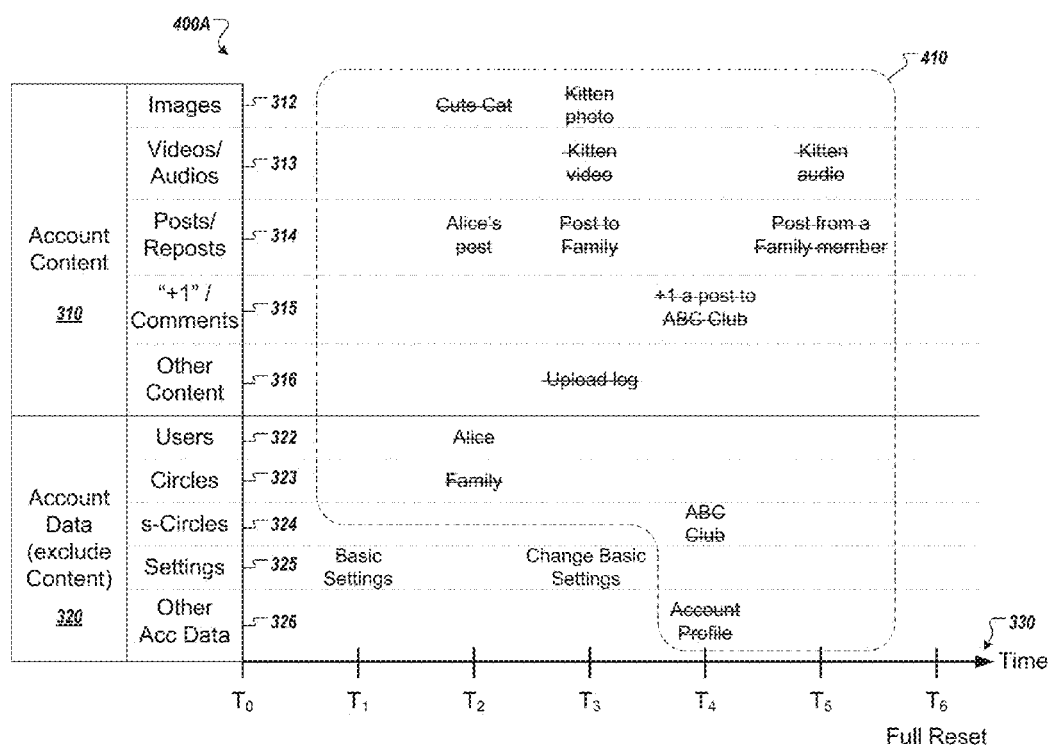
FIGS. 4A-D show a conceptual view of the example online account of FIG. 3 with respect to various options.

FIG. 4A shows a conceptual view of the example online account of FIG. 3 after a full reset. Account 400A shows, for example, that the user of the account performs a full reset at time $T_6$ (e.g., using the "Full Reset" option 211 in UI 200A, FIG. 2A). The effect of the full reset is shown in outline area 410. The example shows that the full reset resets all the account content 310 and account data 320 added to the account (e.g., in the time window $T_1$-$T_5$) except the basic settings configured at time $T_1$ and changed at time $T_3$. The stricken-through text in outline area 410 indicates that the account content and account data have been reset (e.g., deleted or disassociated with the user).

In some implementations, a full reset may reset the account content 310 and account data 320 back to a certain time (e.g., at $T_1$). In those implementations, the changes made to the basic settings at time $T_3$ may be modified, deleted, or disassociated from the user.

In some implementations, the time window (e.g., $T_1$-$T_5$) may be defined by the user requesting the reset. For example, the user may specify resetting the account content 310 and account data 320 from $T_1$ to $T_5$ (e.g., via a mechanism or user interface, no shown, provided to the user to ender the starting time and/or ending time of the time window).

In some implementations, basic settings, which are within the time window, may be excluded from the selection of 410, and the user may be given an option to include the basic settings. In other implementations, basic settings, which are within the selected time window, may be included in the selection of 410, and the user may be given an option to exclude the basic settings.

In some implementations, the user may specified or defined the starting time (e.g., $T_1$) and let the end time be automatically defaulted to, for example, the time at which the request is made received.

In some implementations, a full reset may reset the account content 310 and account data 320 back to a time when the account was created (e.g., at $T_0$). As such, the basic settings configured at time $T_1$ may be deleted, modified, or disassociated from the user.

Before the full reset described above or any reset or rollback described below, the user may perform one or more backup operations (e.g., using the submenu of "Back-Up My Account" 120 of UI 200B, FIG. 2B) to back-up the account content 310 and/or account data 320. In some implementations, content backup and/or data backup may be restored (not shown).

Before the full reset described above or any reset or rollback described below, the user may specified or defined a time window (e.g., providing a start time and/or an end time of the time window via a mechanism or user interface, no shown). The start time and/or the end time of a time window may be implemented with a default value (e.g., the end time being the time the user makes a request to reset or roll back data associated with the user's account).

Figure 4B:
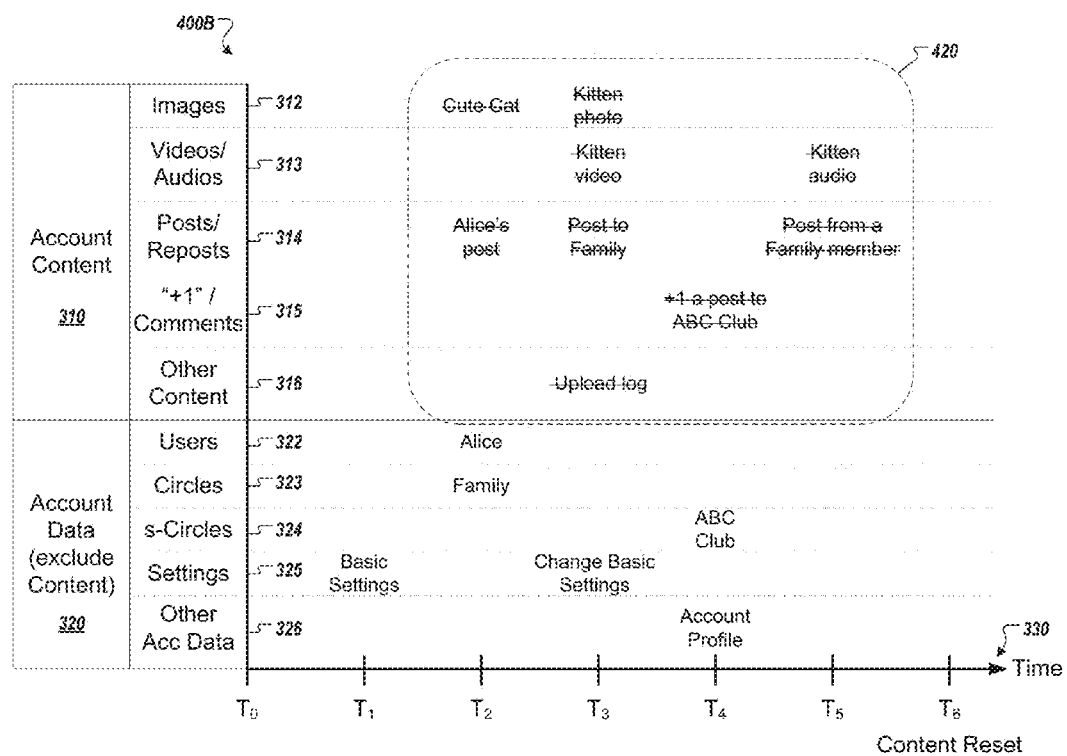

FIG. 4B shows a conceptual view of the example online account of FIG. 3 after a content reset. Account 400B shows, for example, that the user of the account performs a content reset at time $T_6$ (e.g., using the "Content Reset" option 212 in UI 200A, FIG. 2A). The effect of the content reset is shown in outline area 420. The example shows that the content reset resets all the account content 310 added to the account (e.g., in time window $T_1$-$T_5$). The stricken-through text in outline area 420 indicates that the account content has been reset (e.g., deleted or disassociated with the user). The account data added to the account (e.g., at times $T_1$-$T_5$) are untouched.

Figure 4C:
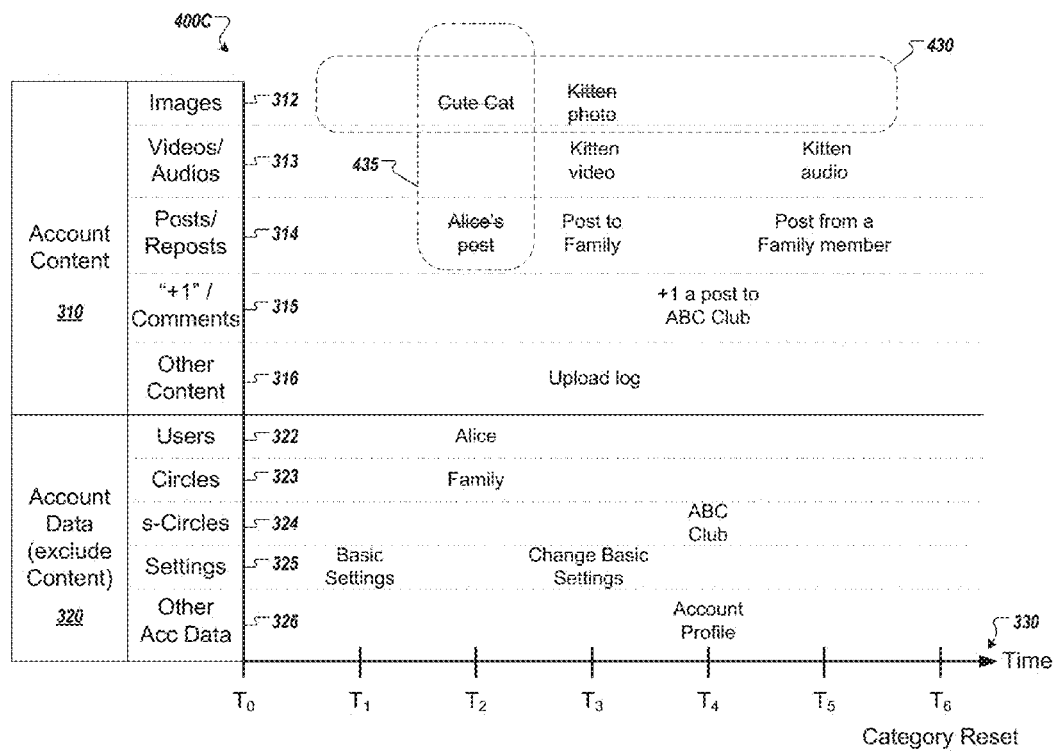

FIG. 4C shows a conceptual view of the example online account of FIG. 3 after an example category reset. Account 400C shows, for example, that the user of the account performs a category reset at time $T_6$ (e.g., using the "Category Reset" option 213 in UI 200A, FIG. 2A). When the user selects the "Category Reset" option 213, for example, a submenu may be provided that lists categories of account content 310 (e.g., categories 312-316) and account data 320 (e.g., categories 322-326) for the user to select. For illustration, the user selects the "Images" 312 category of account content 310 for resetting. The effect of the category reset (e.g., of the "Images" 312 category) is shown in outline area 430 (e.g., with a default time window of $T_1$-$T_5$). In this example, any time window that include the window of $T_2$-$T_3$ is the same since only $T_2$-$T_3$ includes data in the outline area 430.

The example shows that resetting the "Images" 312 category resets all image data 312 added to the account (e.g., at times $T_1$-$T_5$). The stricken-through text in outline area 430 indicates that the images "Cute Cat" and "Kitten photo" have been reset (e.g., deleted or disassociated with the user). The other account content 310 and all account data 320 added to the account (e.g., at times $T_1$-$T_5$) are untouched.

In some implementations, resetting content in one category (e.g., "Images" category 312) may lead to resetting at least some content in another category. For example, since Alice posts the "Cute Cat" in a post at time $T_2$, resetting or deleting the "Cute Cat" image would leave Alice's post being an empty post. Intelligence or logic may be added in these implementations to delete Alice's empty post at time $T_2$. As a result, resetting the "Images" category 312 leads to resetting or deleting Alice's empty post at time $T_2$, as shown in outline area 435 (e.g., the combined reset area is 430 and 435).

Figure 4D:
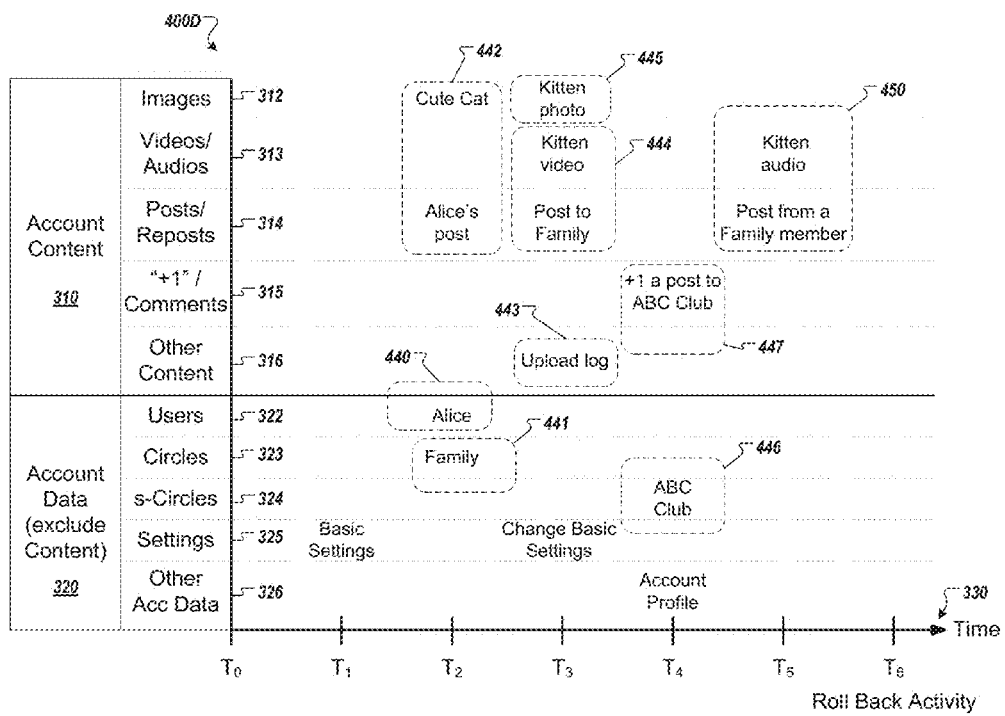

FIG. 4D shows a conceptual view of the example online account of FIG. 3 at a time $T_6$ when the user of the account may be considering rolling back one or more transactions. Account 400D shows that, in some example implementations, the user may select and rollback any one or more of transactions 440-447. Transaction 450, as described above, is not initiated by the user (e.g., the user is a recipient of the post with the kitten audio). In some implementations, transaction 450 may not be a transaction the user can roll back. If the poster of transaction 450 rolls it back, the "Post from a Family member" and the kitten audio may be removed (e.g., deleted) from the user's account or disassociated with the user user's account.

The user of the account may perform rollback operations using, for example, UI 200B, FIG. 2B. The user may use the "Last Transaction" option 216 to roll back the last transaction, which may be transaction 446 or 447, depending on the temporal order (e.g., timestamps) of these transactions. By selecting the "Last Transaction" option 216, the selection by the user may define the time window being from the time before the last transaction is stored to the time just after the last transaction is stored. The user may use the "Select Transaction" option 217 to select one or more of the transactions 440-447 to roll back the selected transactions. For example, a submenu may be provided (not shown) for the user to select one or more transactions or select one or more transactions within time window to roll back. The selected transactions may include adjacent transactions (e.g., transactions that occurred sequentially in time) or non-adjacent transactions (non-contiguous time window).

Transactions 440-447 may be kept as a list, table, or in another data structure with transaction identifiers. For example, when the user posts the "Cute Cat" in "Alice's post" in transaction 442, a transaction identifier may be added for transaction 442, and the transaction identifier may be associated with "Cute Cat" and "Alice's post." When transaction 442 is selected (e.g., in a rollback operation), the transaction identifier may be used to locate the "Cute Cat" image and "Alice's post" for rolling back (e.g., for deletion).

A transaction may involve one service provider or two or more service providers. An example of a transaction that involves one service provider may be a transaction (e.g., a post, comment, feedback, etc.) on a social network. For example, a user (initiator) posting content on the social network to his or her circle of users on the social network (recipients) involves users (e.g., the initiator and recipients) on the social network controlled and/or managed by the service provider of the social network.

When a user rolls back a transaction in a one service provider situation (e.g., rolling back a transaction on a social network or an email, not shown, sent from a user on mail-service-xyz.com to another user on the same mail-service-xyz.com), the service provider has control of the initiator side and the recipient side.

In a one service provider rollback, the service provider may roll back a transaction by restoring the system(s) to the state before the transaction was published or taken. The service provider may remove all traces of the transaction within the confines of the system(s) controlled by the service provider. For example, a user requests a rollback (e.g., removal) of a photo post (e.g., transaction 442) on a social network. The social network removes or deletes "Alice's post" and "Cute Cat" 442 from the user's account, and removes "Alice's post" and "Cute Cat" 442 from the recipient's account (i.e., Alice's account, not shown). The results may be equivalent to erasing the history of the transaction ever happening on both the initiator's side (the user's side) and the recipient's side (Alice's side).

An example of a transaction that involves two or more service providers may be an email. For example, a user (e.g., having email address user@mail-service-xyz.com) may use email services provided by one provider (e.g., mail-service-xyz.com) to send an email to another user (e.g., having email address another-user@A1-mail.net) who uses email services provided by another provider (e.g., A1-mail.net). The email may be initiated by the user (e.g., using an email application) or initiated by a service provider on behalf of the user (e.g., a social network sends notification of a post by a user on the social network to the email addresses of the users who receive the post).

When a user rolls back a transaction that involves more than one service provider (e.g., rolling back an email sent from mail-service-xyz.com to A1-mail.net), the service provider mail-service-xyz.com, from which the user requests a rollback, may not have control of the recipient's service provider A1-mail.net. In these situations, the mail-service-xyz.com may roll back the requested transaction on the system(s) controlled by mail-service-xyz.com (e.g., restores the system(s) into the state before the transaction was published or taken and remove all traces of the transaction within the confines of the system(s) controlled by mail-service-xyz.com).

To roll back the transaction on the recipient's side (e.g., rolling back the email received by A1-mail.net), the service provider mail-service-xyz.com may send a rollback request or notification to A1-mail.net that includes, for example, information about the transaction (e.g., information that identifies in an email from user@mail-service-xyz.com to another-user@A1-mail.net that the user has requested a rollback).

If more than one recipient service providers are involved (e.g., an email sent from one user to multiple recipients who use email services from multiple service providers), the service provider mail-service-xyz.com may send a rollback request or notification to each of the recipient service providers.

In some examples, a recipient service provider (e.g., A1-mail.net) may honor the rollback request and perform the rollback on the system(s) controlled by A1-mail.net (e.g., restore the system(s) into the state before the email was received and remove all traces of the email stored within the confines of the system(s) controlled by A1-mail.net).

In the example implementations herein, data deletion may include deleting the data (e.g., removing from a storage or memory) and/or deleting the association of the data with a user (e.g., disassociating with an account). Data may be disassociated with a user in any way that removes user identifiable information from the data. For example, user identifiable information, such as an identifier, name, telephone number, address, etc. may be removed or anonymized (e.g., replaced with random information). The credential associated with the online account are not changed by the disassociating.

Figure 5:
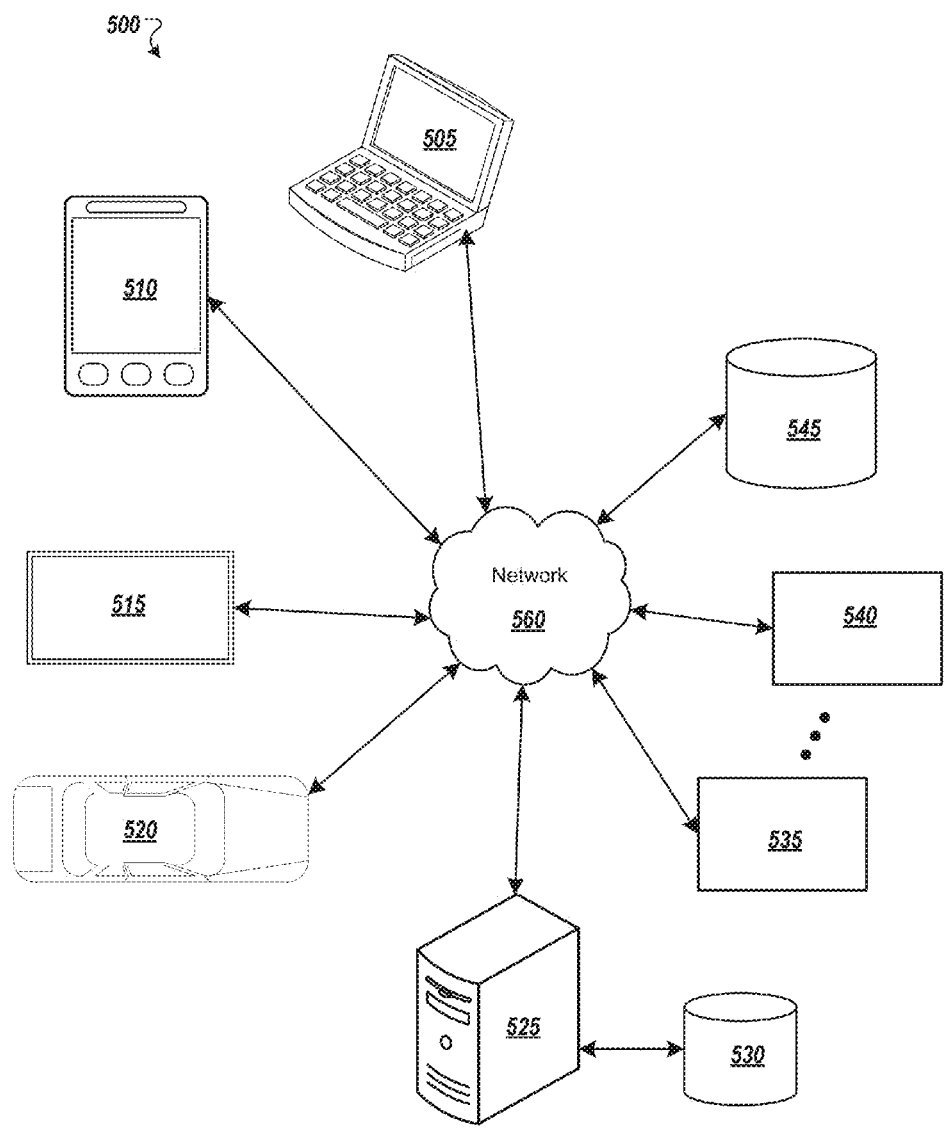
FIG. 5 shows an example online environment in some example implementations.

FIG. 5 shows an example online environment in some example implementations.

Environment 500 includes devices 505-545, and each is communicatively connected to at least one other device via, for example, network 560 (e.g., by wired and/or wireless connections). Some devices may be communicatively connected to one or more storage devices 530 and 545.

An example of one or more devices 505-545 may be computing device 705 described below in FIG. 7. Devices 505-545 may include, but are not limited to, a computer 505 (e.g., a laptop computing device), a mobile device 510 (e.g., smartphone or tablet), a television 515 with one or more processors embedded therein and/or coupled thereto, a device associated with a vehicle 520, a server computer 525, computing devices 535-540, storage devices 530 and 545.

In some implementations, devices 505-520 may be considered user devices (e.g., devices used by users to access services and/or issue requests (e.g., requests to back-up and/or reset requests). Devices 525-545 may be devices associated with service providers (e.g., used by service providers to provide services and/or store account content and/or account data).

For example, a user may issue a reset, roll back, or backup request from user device 505 or 510. The request is received by device 525 (e.g., a server of a service provider). For example, the request may be for resetting at least one category of data associated with the account, which is associated with the user. The data associated with the account may be stored in device 530 and/or 545. In response to the request, device 525, which includes logic to manage the user's account and data, deletes the requested at least one category of data, which may have been accumulated since a time (e.g., a prescribed time) of the account creation or when the user set up basic settings in the account. The user may continue to use his or her account after the account reset using the same credentials associated with the account (e.g., the reset did not reset the user's identifier or password associated with the account).

Figure 6:
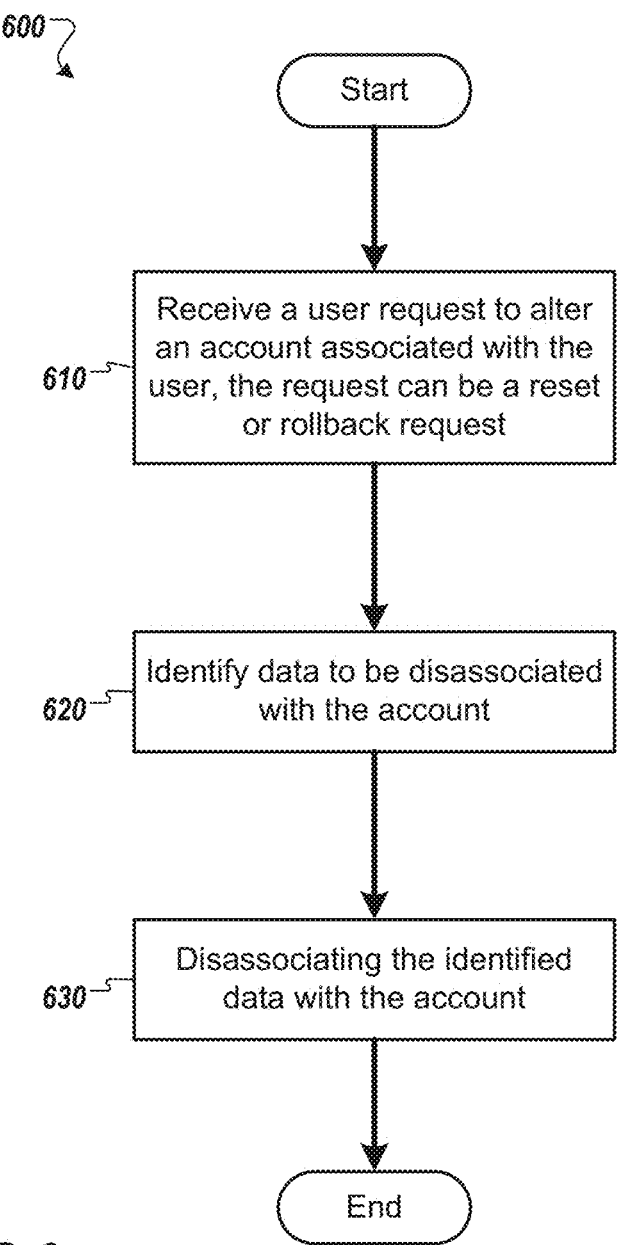
FIG. 6 shows an example process of some example implementations.

FIG. 6 shows an example process of some example implementations. Process 600 includes receiving a request to alter an account associated with a user at block 610. The request can be a reset request or a rollback request, either would lead to altering the account after the request is responded to (e.g., disassociating or deleting data associated with the account). In some implementations, before receiving the request to alter the account, a request may be received to back-up data associated with the account. In some implementations, the request to back-up data may be interpreted from the request to alter the account (e.g., back-up before altering) or issued at the same time as the request to alter the account. The request being issued by a user from a user device (e.g., a client device), which is different from the device that receives the request (e.g., a device or server the service provider of the account).

After receiving the request to alter the account, one or more computing devices of the service provider may be involved in identifying data to be disassociated with the account at block 620. At the time of the request, the identified data are associated with the account and are not stored on the user device.

When the request to alter the account is a reset request (e.g., resetting at least one category of data associated with the account), one or more categories of data accumulated since a prescribed time (e.g., since account creation or basic settings setup) are identifies, depending on whether the request is a full reset, content reset, or category reset.

When the request to alter the account is a rollback request (e.g., rolling back one or more transactions associated with the account) at least one transaction associated with the account is identified.

At block 630, in response to the request, one or more computing devices of the service provider may disassociate the identified data with the account or delete the identified data from the account. There is no downtime to the account (e.g., the account is available for use by the user using the same account credentials).

In some examples, process 600 may be implemented with different, fewer, or more blocks. Process 600 may be implemented as computer executable instructions, which can be stored on a medium, loaded onto one or more processors of one or more computing devices, and executed as a computer-implemented method.

Figure 7:
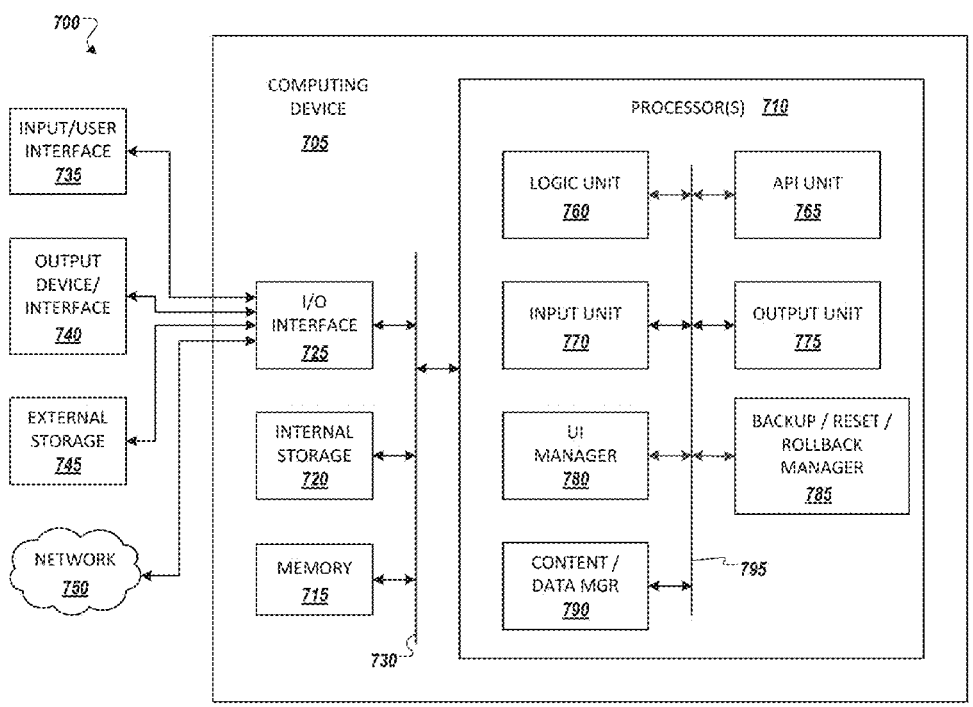
FIG. 7 shows an example computing environment with an example computing device suitable for some example implementations.

FIG. 7 shows an example computing environment with an example computing device suitable for some example implementations. Computing device 705 in computing environment 700 can include one or more processing units, cores, or processors 710, memory 715 (e.g., RAM, ROM, and/or the like), internal storage 720 (e.g., magnetic, optical, solid state storage, and/or organic), and/or I/O interface 725, any of which can be coupled on a communication mechanism or bus 730 for communicating information or embedded in the computing device 705.

Computing device 705 can be communicatively coupled to input/user interface 735 and output device/interface 740. Either one or both of input/user interface 735 and output device/interface 740 can be a wired or wireless interface and can be detachable. Input/user interface 735 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 740 may include a display, television, monitor, printer, speaker, braille, or the like. In some example implementations, input/user interface 735 and output device/interface 740 can be embedded with or physically coupled to the computing device 705. In example implementations, other computing devices may function as or provide the functions of input/user interface 735 and output device/interface 740 for a computing device 705.

Examples of computing device 705 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 705 can be communicatively coupled (e.g., via I/O interface 725) to external storage 745 and network 750 for communicating with any number of networked components, devices, and systems, including one or more computing devices of the same or different configuration. Computing device 705 or any connected computing device can be functioning as, providing services of, or referred to as a server, client, thin server, general machine, special-purpose machine, or another label.

I/O interface 725 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 700. Network 750 can be any network or combination of networks (e.g., the Internet, local area network, wide area network, a telephonic network, a cellular network, satellite network, and the like).

Computing device 705 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 705 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 710 can execute under any operating system (OS) (not shown), in a native or virtual environment. One or more applications can be deployed that include logic unit 760, application programming interface (API) unit 765, input unit 770, output unit 775, UI manager 780, backup/reset/rollback manager 785, content/data manager 790, and inter-unit communication mechanism 795 for the different units to communicate with each other, with the OS, and with other applications (not shown). For example, feedback management unit UI manager 780, backup/reset/rollback manager 785, and content/data manager 790 may implement one or more processes shown in FIG. 6. The described units and elements can be varied in design, function, configuration, or implementation and are not limited to the descriptions provided.

In some example implementations, when information or an execution instruction is received by API unit 765, it may be communicated to one or more other units (e.g., logic unit 760, input unit 770, output unit 775, UI manager 780, backup/reset/rollback manager 785, and content/data manager 790). For example, UI manager 780 may provide the UI 200A on a user device for a user to enter a request a reset to an account, which is received by input unit 770 and forwarded to backup/reset/rollback manager 785 via API unit 765. Backup/reset/rollback manager 785 communicates with content/data manager 790 to reset the user's account according to the reset request.

In some example implementations, logic unit 760 may be configured to control the information flow among the units and direct the services provided by API unit 765, input unit 770, output unit 775, UI manager 780, backup/reset/rollback manager 785, and content/data manager 790. For example, the flow of one or more processes or implementations may be controlled by logic unit 760 alone or in conjunction with API unit 765.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A computer-implemented method, comprising:
   receiving from a user, by one or more computing devices, a request to alter, for a user-selected transaction selected from prior transactions, an online account associated with a first service provider and the user, and for another online account associated with a second service provider and the user;
   identifying, based on the request, at least a portion of data associated with the user and the online account, the at least the portion of data identified as being within a time window based on the request received from the user; and
   in response to the request, deleting, using the one or more computing devices, one or more transaction identifiers that associate the user with the at least the portion of data within the time window for the user-selected transaction,
   wherein the request includes a notification from the user or the first service provider, for the second service provider to determine whether to perform the deleting.

2. The method of claim 1, wherein the time window comprises a starting time and an ending time, at least the starting time is provided by the user with the request.

3. The method of claim 1, wherein the time window comprises a starting time and an ending time, the ending time is defined by a time when the request is received.

4. The method of claim 1, wherein the deleting the at least the portion of data comprises disassociating the at least the portion of data from the user.

5. The method of claim 1, wherein the request is a reset request for a full reset, the at least the portion of data comprise content data and account data, and the time window being from a time after initialization settings of the account have been set up to another time when the request is received.

6. The method of claim 1, wherein the request is a reset request for a content reset, the at least the portion of data comprise content data and no account data.

7. The method of claim 1, wherein the request is a reset request for a category reset, the method further comprising receiving a category selection from the user of the at least the portion of data.

8. The method of claim 1, wherein the request is a rollback request and the at least the portion of data is identified from the prior transactions associated with the account.

9. The method of claim 1, further comprising:
receiving another request, before the request to alter the account, from the user to back-up data associated with the account, the backup data comprise the at least the portion of data; and
storing the backup data.

10. The method of claim 9, further comprising:
receiving a restore request from the user; an
restoring at least a portion of the backup data, wherein the at least a portion of the backup data are restored to associate with the account.

11. The method of claim 9, wherein the another request is a backup request, the method further comprising providing a user interface that comprises a control for the user to enter the backup request.

12. The method of claim 1, wherein the request is a reset request, the method further comprising providing a user interface that comprises a control for the user to enter the reset request to alter the account.

13. The method of claim 1, wherein the request is a rollback request, the method further comprising providing a user interface that comprises a control for the user to enter the rollback request to alter the account.

14. A non-transitory computer readable medium having stored therein computer executable instructions for:
receiving from a user, by one or more computing devices, a request to alter, for a user-selected transaction selected from prior transactions, an online account associated with a first service provider and the user, and for another online account associated with a second service provider and the user;
identifying, based on the request, at least a portion of data associated with the user and the online account, the at least the portion of data identified as being within a time window based on the request received from the user; and
in response to the request, deleting, using the one or more computing devices, one or more transaction identifiers that associate the user with the at least the portion of data within the time window for the user-selected transaction,
wherein the request includes a notification from the user or the first service provider, for the second service provider to determine whether to perform the deleting.

15. The computer readable medium of claim 14, wherein the deleting the at least the portion of data comprises disassociating the at least the portion of data from the user.

16. The non-transitory computer readable medium of claim 14, wherein the deleting comprises anonymizing the identifiable information of the user to be replaced with random information, without modifying the credential associated with the online account.

17. At least one computing device comprising storage and a processor configured to perform:
receiving from a user, by one or more computing devices, a request to alter, for a user-selected transaction selected from prior transactions, an online account associated with a first service provider and the user, and for another online account associated with a second service provider and the user;
identifying, based on the request, at least a portion of data associated with the user and the online account, the at least the portion of data identified as being within a time window based on the request received from the user; and
in response to the request, deleting, using the one or more computing devices, one or more transaction identifiers that associate the user with the at least the portion of data within the time window for the user-selected transaction,
wherein the request includes a notification from the user or the first service provider, for the second service provider to determine whether to perform the deleting.

18. The method of claim 17, wherein the deleting the at least the portion of data comprises disassociating the at least the portion of data from the user.

19. The method of claim 1, wherein the deleting comprises anonymizing the identifiable information of the user to be replaced with random information, without modifying the credential associated with the online account.

20. The method of claim 17, wherein the deleting comprises anonymizing the identifiable information of the user to be replaced with random information, without modifying the credential associated with the online account.

* * * * *